(12) United States Patent
Fontaine et al.

(10) Patent No.: US 9,970,295 B2
(45) Date of Patent: May 15, 2018

(54) ENGINE ASSEMBLY WITH TURBINE SUPPORT CASING

(71) Applicant: Pratt & Whitney Canada Corp., Longueuil (CA)

(72) Inventors: Mike Fontaine, Boucherville (CA); Sebastien Bolduc, St-Bruno-de-Montarville (CA); Bruno Villeneuve, Boucherville (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 162 days.

(21) Appl. No.: 15/010,933

(22) Filed: Jan. 29, 2016

(65) Prior Publication Data

US 2017/0218760 A1    Aug. 3, 2017

(51) Int. Cl.

| F01C 21/10 | (2006.01) |
| F02B 41/10 | (2006.01) |
| F02B 53/02 | (2006.01) |
| F01C 1/22  | (2006.01) |
| F01C 11/00 | (2006.01) |
| F01N 13/18 | (2010.01) |

(Continued)

(52) U.S. Cl.
CPC ............... *F01C 21/10* (2013.01); *F01C 1/22* (2013.01); *F01C 11/008* (2013.01); *F01D 9/026* (2013.01); *F01N 13/1844* (2013.01); *F02B 41/10* (2013.01); *F02B 53/02* (2013.01); *F02C 5/06* (2013.01); *F02C 6/12* (2013.01); *F02B 2053/005* (2013.01); *F05D 2220/40* (2013.01); *F05D 2230/642* (2013.01)

(58) Field of Classification Search
CPC .......... F01C 1/22; F01C 11/008; F01C 21/10; F01D 9/026; F01N 13/1844; F02B 41/10; F02B 53/02; F02B 2053/005; F02C 5/06; F02C 6/12; F05D 2220/40; F05D 2230/642

See application file for complete search history.

(56) References Cited

U.S. PATENT DOCUMENTS

| 4,559,783 A | 12/1985 | Ampferer |
| 4,964,275 A | 10/1990 | Marius et al. |

(Continued)

FOREIGN PATENT DOCUMENTS

| JP | 08074570   | 3/1996 |
| WO | 2011113793 | 9/2011 |
| WO | 2013109433 | 7/2013 |

*Primary Examiner* — Brandon Lee
(74) *Attorney, Agent, or Firm* — Norton Rose Fulbright Canada

(57) ABSTRACT

An engine assembly having an internal combustion engine, a turbine module including a turbine casing, a support casing rigidly connecting the turbine casing to a remainder of the assembly, and an inlet scroll connected to the turbine casing without any direct rigid connection to the support casing. The inlet scroll includes an inlet pipe for each engine exhaust port. An exhaust pipe is provided for each exhaust port, connected to and providing fluid communication between the respective exhaust port and inlet pipe. The exhaust pipe is movable relative to at least one of the exhaust port and the inlet pipe at a corresponding connection therewith. One of the exhaust and inlet pipes floatingly extends through an opening defined in the support casing. The assembly may be a compound engine assembly.

20 Claims, 7 Drawing Sheets

(51) Int. Cl.
    *F01D 9/02*     (2006.01)
    *F02C 5/06*     (2006.01)
    *F02C 6/12*     (2006.01)
    *F02B 53/00*     (2006.01)

(56) References Cited

U.S. PATENT DOCUMENTS

| | | |
|---|---|---|
| 5,142,867 A | 9/1992 | Bergmann et al. |
| 5,639,222 A | 6/1997 | Kieffer |
| 8,307,649 B2 | 11/2012 | Axelsson et al. |
| 8,443,602 B2 | 5/2013 | Bennet et al. |
| 8,997,487 B2 * | 4/2015 | Drangel ................ F02B 39/005 417/407 |
| 9,016,060 B2 | 4/2015 | Sauerstein |
| 2010/0229551 A1 | 9/2010 | Wu et al. |
| 2013/0291540 A1 | 11/2013 | Serres et al. |
| 2014/0020381 A1 * | 1/2014 | Bolduc .................... F01C 1/22 60/605.1 |
| 2015/0275749 A1 | 10/2015 | Thomassin |

\* cited by examiner

ENGINE ASSEMBLY WITH TURBINE SUPPORT CASING

TECHNICAL FIELD

The application relates generally to engine assemblies and, more particularly, to such engine assemblies including one or more internal combustion engine(s) in fluid communication with a turbine.

BACKGROUND OF THE ART

In engine assemblies including internal combustion engine(s) in fluid communication with a turbine, the exhaust pipes and/or any other ducting structure interconnecting the engine(s) and turbine to provide such fluid communication may experience significant thermal expansion due to the relatively high temperature of the exhaust gases circulated therethrough. Such thermal expansion may create loads on the engine(s) and/or turbine structure. In addition, rigid connection(s) between the turbine and engine(s) forms load path(s) for a number of other loads due for example to rotor unbalance, flight manoeuvres, weight of components, etc.

SUMMARY

In one aspect, there is provided an engine assembly comprising: an engine core including an internal combustion engine having an exhaust port; a turbine module including a turbine casing containing a turbine, a support casing rigidly connecting the turbine casing to a remainder of the assembly, and an inlet scroll connected to the turbine casing without any direct rigid connection to the support casing, the inlet scroll including an inlet pipe in fluid communication with an inlet of the turbine; and an exhaust pipe connected to and providing fluid communication between the exhaust port and the inlet pipe, the exhaust pipe movable relative to at least one of the exhaust port and the inlet pipe at a corresponding connection therewith; wherein one of exhaust and inlet pipes floatingly extends through a corresponding opening defined in the support casing.

In another aspect, there is provided a compound engine assembly comprising:

an engine core including at least one internal combustion engine in driving engagement with an output shaft, each internal combustion engine including a rotor sealingly and rotationally received within an internal cavity to provide rotating chambers of variable volume in the internal cavity, each internal combustion engine including an exhaust port and an inlet port in fluid communication with the internal cavity thereof; a turbine module including a turbine casing containing a turbine having a turbine shaft in driving engagement with the output shaft through a gearbox module, a support casing rigidly connecting the turbine casing to the gearbox module, the turbine shaft extending inside the support casing, and an inlet scroll connected to the turbine casing without any direct rigid connection to the support casing, the inlet scroll including a respective inlet pipe for each exhaust port, each inlet pipe in fluid communication with an inlet of the turbine; an exhaust pipe for each exhaust port, each exhaust pipe connected to and providing fluid communication between the respective exhaust port and the respective inlet pipe, each exhaust pipe being movable relative to at least one of the respective exhaust port and the respective inlet pipe at a corresponding connection therewith; wherein one of each connected exhaust and inlet pipes extends through a corresponding opening defined through the support casing without any direct rigid connection to the support casing.

In a further aspect, there is provided an engine assembly comprising an internal combustion engine in fluid communication with a downstream turbine via an inlet scroll, the turbine drivingly connected to a gearbox, the turbine mounted to the gearbox via a support casing, the support casing having an opening through which the inlet scroll or an exhaust pipe providing fluid communication between the internal combustion engine and the inlet scroll passes from an exterior of the support casing to the interior of the support casing, the inlet scroll or exhaust pipe floatingly received through the opening, the exhaust pipe having a movable connection with one or both of the inlet scroll and the internal combustion engine.

DESCRIPTION OF THE DRAWINGS

Reference is now made to the accompanying figures in which.

DETAILED DESCRIPTION

Figure 1:
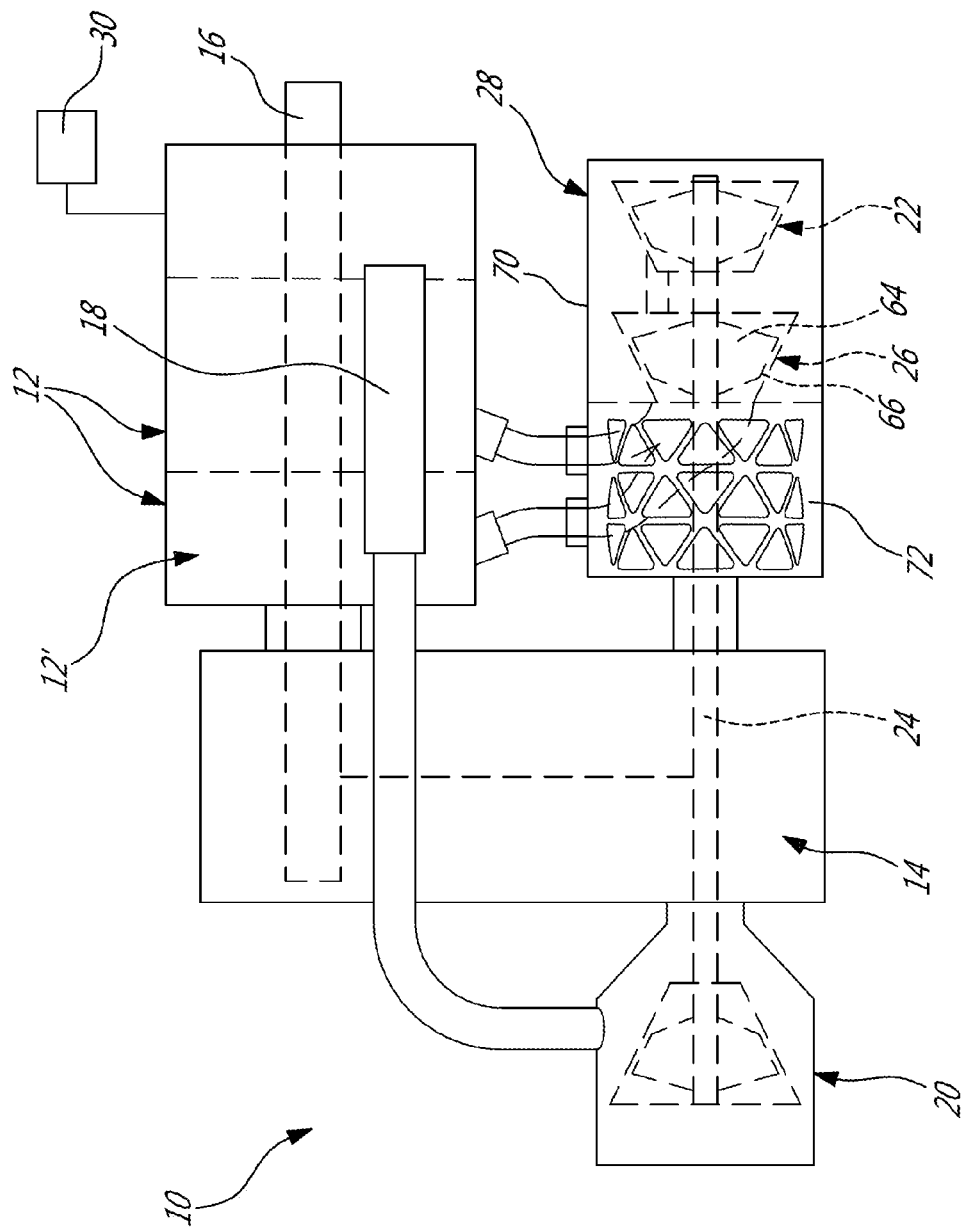
FIG. 1 is a schematic representation of a compound engine assembly in accordance with a particular embodiment.

Referring to FIG. 1, a compound engine assembly 10 is schematically shown. The compound engine assembly 10 includes an engine core 12' with one or more internal combustion engine(s) 12. The core engine(s) 12 drive a common load. In the embodiment shown, the common load includes an output shaft 16 which may be for example connected to a propeller through a reduction gearbox (not shown) and to which each core engine 12 is engaged. Other possible common loads may include, but are not limited to, one or more compressor and/or fan rotor(s), electrical generator(s), accessories, rotor mast(s), or any other type of load or combination thereof.

In a particular embodiment, the compound engine assembly 10 also includes a turbocharger including a compressor 20 and a second stage turbine 22 which are drivingly engaged; in the embodiment shown, they are interconnected by a common turbine shaft 24. The compressor 20 and the second stage turbine 22 may each be a single-stage device or a multiple-stage device with a single shaft or split on multiple independent shafts in parallel or in series, and may each be a centrifugal or axial device. The compressor 20 compresses the air before it is circulated to the core engine(s) 12 through an inlet manifold 18. The compressor 20 and the second stage turbine 22 may each include one or more rotors, with radial, axial or mixed flow blades.

In the embodiment shown, the turbine shaft 24 extends along a different axis than that of the output shaft 16, and parallel thereto; alternately, the turbine shaft 24 may extend transverse to the output shaft 16, or may be defined coaxially with the output shaft 16. The turbine shaft 24 and output shaft 16 are in driving engagement with one another, through a gearbox module 14 including any suitable type of transmission or gearbox, for example a planetary, star, offset or angular gear system.

Alternately, the turbocharger may be omitted.

Each core engine 12 provides an exhaust flow in the form of exhaust pulses. The exhaust flow from the core engines 12 is supplied to a compound or first stage turbine 26 in fluid communication therewith. The first stage turbine 26 could be an axial, radial or mixed flow turbine. The rotor blades 64 of the rotor of the first stage turbine 26 extend across an annular flow path 66. In the embodiment shown, the rotor of the first stage turbine 26 is an axial rotor and the flow path 66 extends axially. In the embodiment shown, the first stage turbine 26 is drivingly interconnected to the second stage turbine 22 by being mounted to the same turbine shaft 24, and accordingly also drivingly engaged to the output shaft 16 through the gearbox module 14. In an alternate embodiment, the turbines 26, 22 may rotate independently, with the first stage turbine 26 drivingly engaged to the output shaft 16, e.g. via the gearbox module 14, and the second stage turbine 22 drivingly engaged to the compressor 20.

The outlet of the first stage turbine 26 is in fluid communication with an inlet of the second stage turbine 22. Energy is extracted from the exhaust gas exiting the first stage turbine 26 by the second stage turbine 22 to drive the compressor 20 via the connecting shaft 24. Both turbines form part of a turbine module 28, which will be further described below. In a particular embodiment, the second stage turbine 22 is a pressure turbine, also known as a reaction turbine, and the first stage turbine 26 is configured as a velocity type turbine, also known as an impulse turbine.

A pure impulse turbine works by changing the direction of the flow without accelerating the flow inside the rotor; the fluid is deflected without a significant pressure drop across the rotor blades. The blades of the pure impulse turbine are designed such that in a transverse plane perpendicular to the direction of flow, the area defined between the blades is the same at the leading edges of the blades and at the trailing edges of the blade: the flow area of the turbine is constant, and the blades are usually symmetrical about the plane of the rotating disc. The work of the pure impulse turbine is due only to the change of direction in the flow through the turbine blades. Typical pure impulse turbines include steam and hydraulic turbines.

In contrast, a reaction turbine accelerates the flow inside the rotor but needs a static pressure drop across the rotor to enable this flow acceleration. The blades of the reaction turbine are designed such that in a transverse plane perpendicular to the direction of flow, the area defined between the blades is larger at the leading edges of the blades than at the trailing edges of the blade: the flow area of the turbine reduces along the direction of flow, and the blades are usually not symmetrical about the plane of the rotating disc. The work of the pure reaction turbine is due mostly to the acceleration of the flow through the turbine blades.

Most aeronautical turbines are not "pure impulse" or "pure reaction", but rather operate following a mix of these two opposite but complementary principles—i.e. there is a pressure drop across the blades, there is some reduction of flow area of the turbine blades along the direction of flow, and the speed of rotation of the turbine is due to both the acceleration and the change of direction of the flow. The degree of reaction of a turbine can be determined using the temperature-based reaction ratio (equation 1) or the pressure-based reaction ratio (equation 2), which are typically close to one another in value for a same turbine:

$$\text{Reaction}(T) = \frac{(t_{S3} - t_{S5})}{(t_{S0} - t_{S5})} \quad (1)$$

$$\text{Reaction}(P) = \frac{(P_{S3} - P_{S5})}{(P_{S0} - P_{S5})} \quad (2)$$

where T is temperature and P is pressure, s refers to a static port, and the numbers refers to the location the temperature or pressure is measured: 0 for the inlet of the turbine vane (stator), 3 for the inlet of the turbine blade (rotor) and 5 for the exit of the turbine blade (rotor); and where a pure impulse turbine would have a ratio of 0 (0%) and a pure reaction turbine would have a ratio of 1 (100%).

Aeronautical turbines referred to as impulse turbines typically have a reaction ration of 0.25 (25% reaction) or lower, although other values are also possible.

In a particular embodiment, the first stage turbine 26 is configured to take benefit of the kinetic energy of the pulsating flow exiting the core engine(s) 12 while stabilizing the flow, and the second stage turbine 22 is configured to extract energy from the remaining pressure in the flow. Accordingly, the first stage turbine 26 has a lower (i.e. lower value) reaction ratio than that of the second stage turbine 22.

In a particular embodiment, the second stage turbine 22 has a reaction ratio higher than 0.25; in another particular embodiment, the second stage turbine 22 has a reaction ratio higher than 0.3; in another particular embodiment, the second stage turbine 22 has a reaction ratio of about 0.5; in another particular embodiment, the second stage turbine 22 has a reaction ratio higher than 0.5.

In a particular embodiment, the first stage turbine 26 has a reaction ratio of at most 0.2; in another particular embodiment, the first stage turbine 26 has a reaction ratio of at most 0.15; in another particular embodiment, the first stage turbine 26 has a reaction ratio of at most 0.1; in another particular embodiment, the first stage turbine 26 has a reaction ratio of at most 0.05.

It is understood that any of the above-mentioned reaction ratios for the second stage turbine 22 can be combined with any of the above-mentioned reaction ratios for the first stage turbine 26 and that these ratios can be pressure-based or temperature-based. Other values are also possible.

Although not shown, the air may optionally circulate through an intercooler between the compressor 20 and the core engine(s) 12, and the engine assembly 10 also includes a cooling system, including for example a circulation system for a coolant (e.g. water-ethylene, oil, air) to cool the housing of each core engine 12, an oil coolant for the internal mechanical parts of the core engine(s) 12, one or more coolant heat exchangers, etc.

The fuel injector(s) of each core engine 12, which in a particular embodiment are common rail fuel injectors, communicate with a source 30 of Heavy fuel (e.g. diesel, kerosene (jet fuel), equivalent biofuel), and deliver the heavy fuel into the core engine(s) 12 such that the combustion chamber is stratified with a rich fuel-air mixture near the ignition source and a leaner mixture elsewhere.

Figure 2:
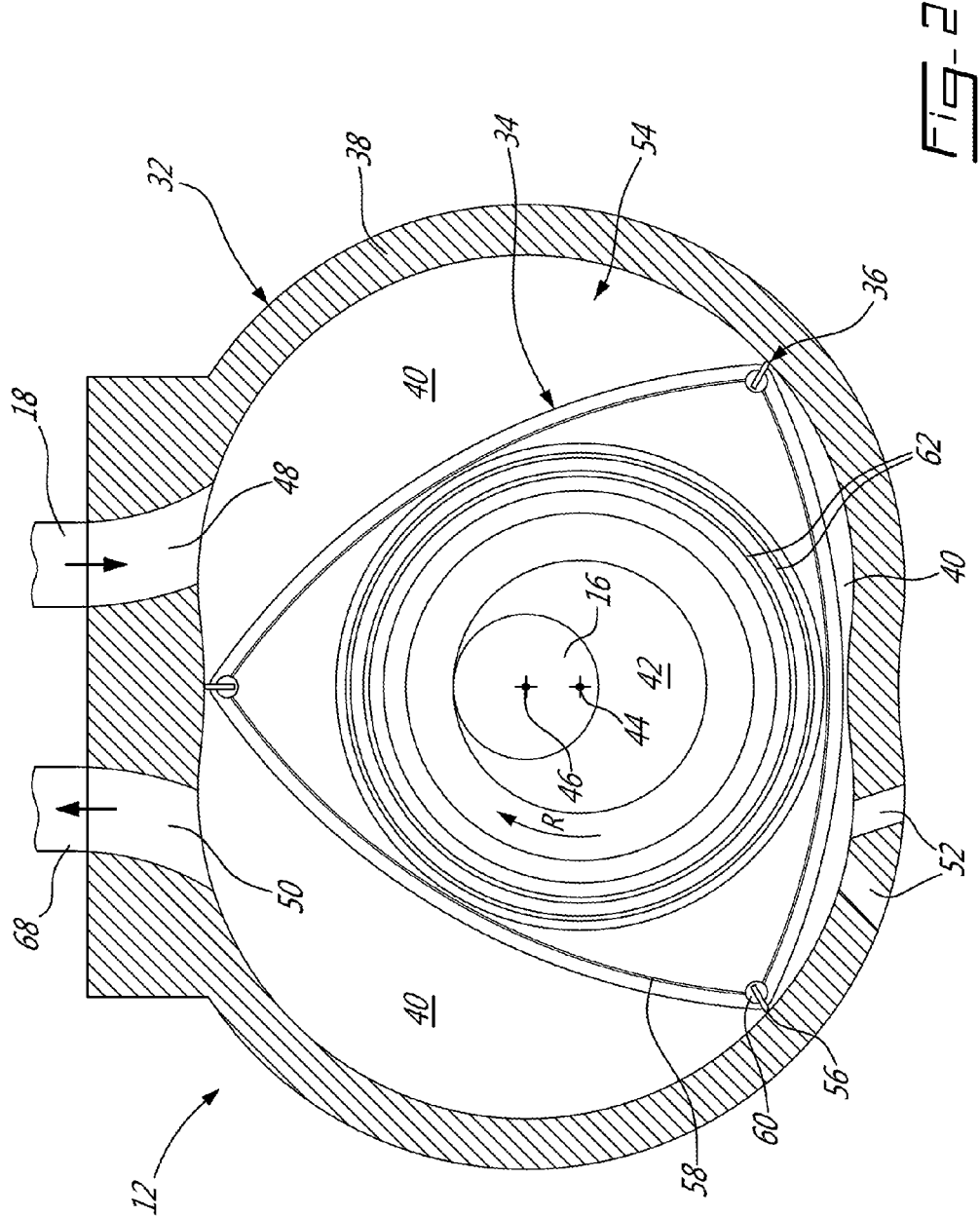
FIG. 2 is a schematic cross-sectional view of a Wankel engine which can be used in a compound engine assembly such as shown in FIG. 1, according to a particular embodiment.

In the embodiment shown the compound engine assembly 10 includes two (2) core engines 12. In a particular embodiment, each core engine 12 is a rotary internal combustion engine having a rotor sealingly engaged in a respective housing, for example a Wankel rotary engine. Referring to FIG. 2, an exemplary embodiment of a Wankel engine is shown; it is understood that the configuration of the core engine(s) 12 used in the compound engine assembly 10, e.g. placement of ports, number and placement of seals, etc., may vary from that of the embodiment shown. In addition, it is understood that each core engine 12 may be any other type of internal combustion engine including, but not limited to, any other type of rotary engine, and any other type of internal combustion engine (e.g. reciprocating engine). More or less core engines 12 may be provided; as non-limiting examples, in other particular embodiments, the engine core 12' includes a single Wankel engine, or four (4) Wankel engines, or any suitable number of internal combustion engines having any other suitable configuration (e.g. reciprocating engine).

As shown in FIG. 2, each Wankel engine comprises a housing 32 defining an internal cavity with a profile defining two lobes, which is preferably an epitrochoid. A rotor 34 is received within the internal cavity. The rotor defines three circumferentially-spaced apex portions 36, and a generally triangular profile with outwardly arched sides. The apex portions 36 are in sealing engagement with the inner surface of a peripheral wall 38 of the housing 32 to form three working chambers 40 between the rotor 34 and the housing 32.

The rotor 34 is engaged to an eccentric portion 42 of the output shaft 16 to perform orbital revolutions within the internal cavity. The output shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the internal cavity to undergo the four phases of intake, compression, expansion and exhaust. The difference between the maximum and minimum volumes of each chamber 40 during the revolutions of the rotor 34 defines a displacement volume Vd of the engine.

An intake port 48 is provided through the peripheral wall 38 for successively admitting compressed air from the inlet manifold 18 into each working chamber 40. An exhaust port 50 is also provided through the peripheral wall 38 for successively discharging the exhaust gases from each working chamber 40. Passages 52 for a glow plug, spark plug or other ignition element, as well as for one or more fuel injectors (not shown) are also provided through the peripheral wall 38. Alternately, the intake port 48, the exhaust port 50 and/or the passages 52 may be provided through an end or side wall 54 of the housing; and/or, the ignition element and a pilot fuel injector may communicate with a pilot subchamber (not shown) defined in the housing 32 and communicating with the internal cavity for providing a pilot injection. The pilot subchamber may be for example defined in an insert (not shown) received in the peripheral wall 38.

For efficient operation the working chambers 40 are sealed, for example by spring-loaded apex seals 56 extending from the rotor 34 to engage the peripheral wall 38, and spring-loaded face or gas seals 58 and end or corner seals 60 extending from the rotor 34 to engage the end walls 54. The rotor 34 also includes at least one spring-loaded oil seal ring 62 biased against the end wall 54 around the bearing for the rotor 34 on the shaft eccentric portion 42.

Each Wankel engine provides an exhaust flow in the form of a relatively long exhaust pulse; for example, in a particular embodiment, each Wankel engine has one explosion per 360° of rotation of the output shaft, with the exhaust port remaining open for about 270° of that rotation.

In a particular embodiment which may be particularly but not exclusively suitable for low altitude, each Wankel engine has a volumetric expansion ratio of from 5 to 9, and a volumetric compression ratio lower than the volumetric expansion ratio. The power recovery of the first stage turbine 26 may be maximized by having the exhaust gas temperatures at the material limit, and as such is suitable for such relatively low volumetric compression ratios, which may help increase the power density of the Wankel engine and may also improve combustion at high speed and of heavy fuel.

Figure 3:
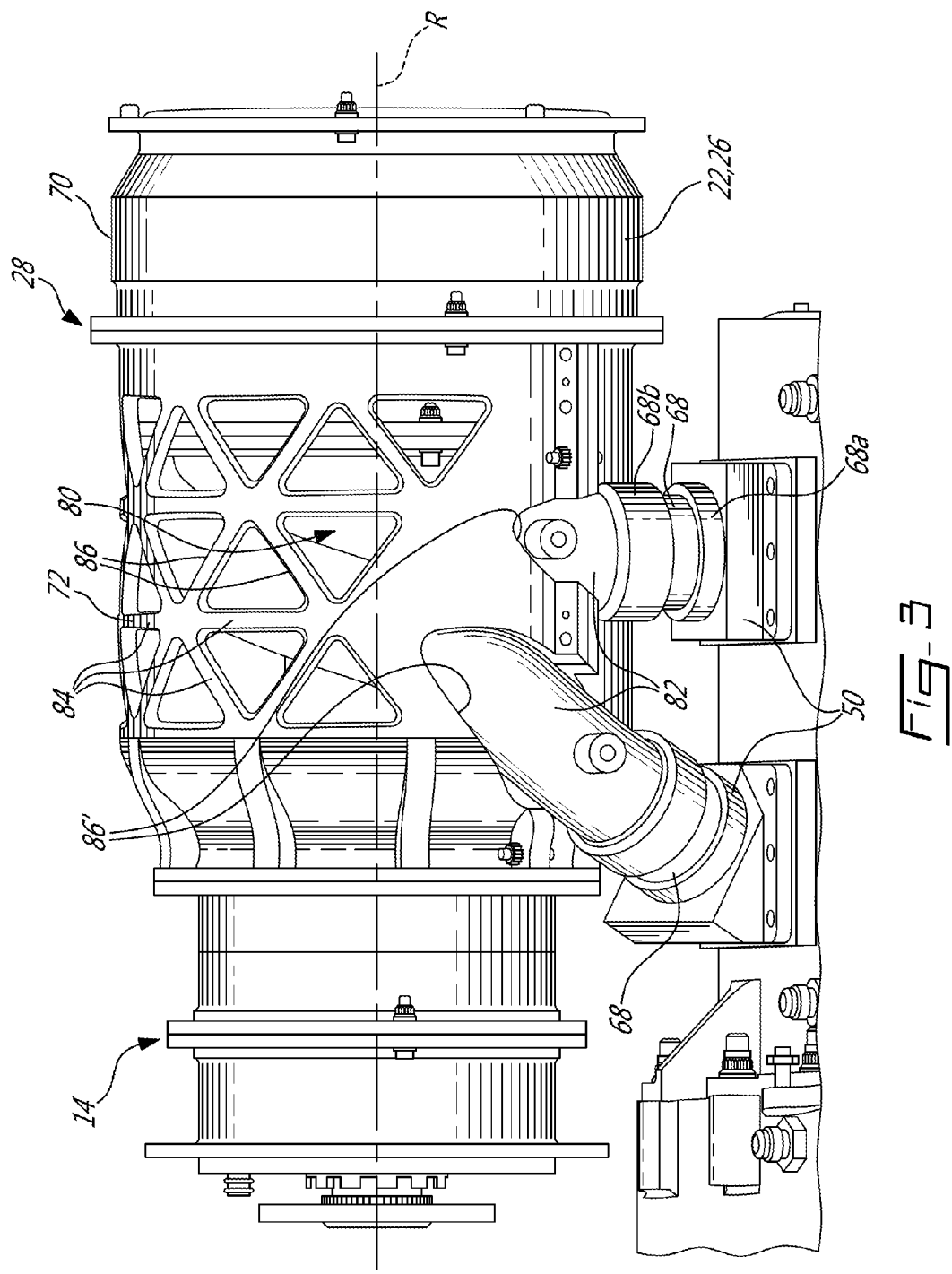
FIG. 3 is schematic top view of part of the compound engine assembly of FIG. 1, including a turbine module and part of a gearbox module according to a particular embodiment.

Referring to FIG. 3, the turbine module 28 includes a turbine casing 70 containing the turbines 22, 26. The turbine casing 70 is annular, and may be monolithic or alternately made of two or more interconnected segments. The turbine module 28 further includes a support casing 72 rigidly connected to the turbine casing 70, through which the turbine casing 70 is connected to a remainder of the engine assembly 10, including the engine core 12'. In the embodiment shown, the support casing 72 is rigidly connected to the gearbox module 14 (part of which is shown in FIG. 3), and the engine core 12' is also rigidly connected to the gearbox module 14 (see FIG. 1), for example to the engine housings. A load path is thus defined between the turbine casing 70 and the engine core 12' through the support casing 72 and gearbox module 14. Alternate configurations are also possible, including, but not limited to, the support casing 72 being directly rigidly connected to the engine core 12'.

In the present specification and claims, the term "rigid" or "rigidly" as applied to a connection is intended to encompass any type of connection which allows a transfer of loads between the connected elements, including, but not limited to, reversible connections (e.g. fasteners) preventing or designed to prevent relative movement between the connected elements, and permanent connections (e.g. welding, brazing, monolithic assembly of elements, flanges clamped with a V-band coupling).

Figure 4:
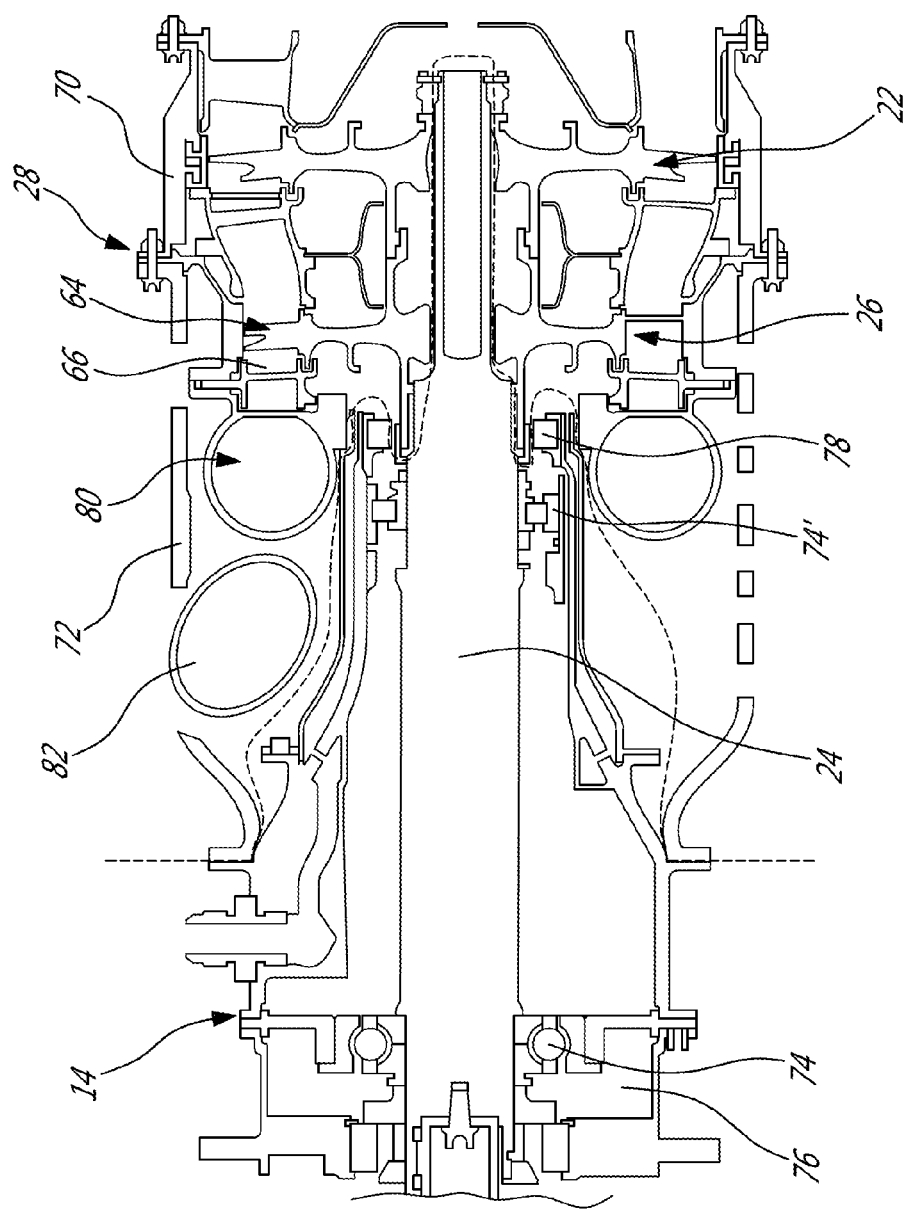
FIG. 4 is a schematic cross-sectional view of the turbine module and part of the gearbox module of FIG. 3, in accordance with a particular embodiment.

In a particular embodiment and as can be best seen in FIG. 4, the support casing 72 directs the alignment of the static elements of the turbine module (e.g. scroll, vanes and housings) relative to the turbine shaft 24 and the rotating elements of the turbine module 28, the shaft 24 and rotating elements being supported via bearings 74, 74' and structure in the gearbox module 14. The support casing 72 thus also surrounds a part of the gearbox module 14 encasing the turbine shaft 24, including the rear shaft bearings 74', oil feed system and scavenge cavities and tubes 76, and carbon seals 78. A dotted lines illustrates the separation between the elements forming part of the turbine module 28 (right) and the elements forming part of the gearbox module 14 (left). The turbine module 28 is thus free of oil system features, which in a particular embodiment facilitates removal of the turbine module 28 from the engine assembly 10.

In a particular embodiment, the support casing 72 forms the only rigid connection between the turbine casing 70 and the remainder of the engine assembly 10.

Figure 5:
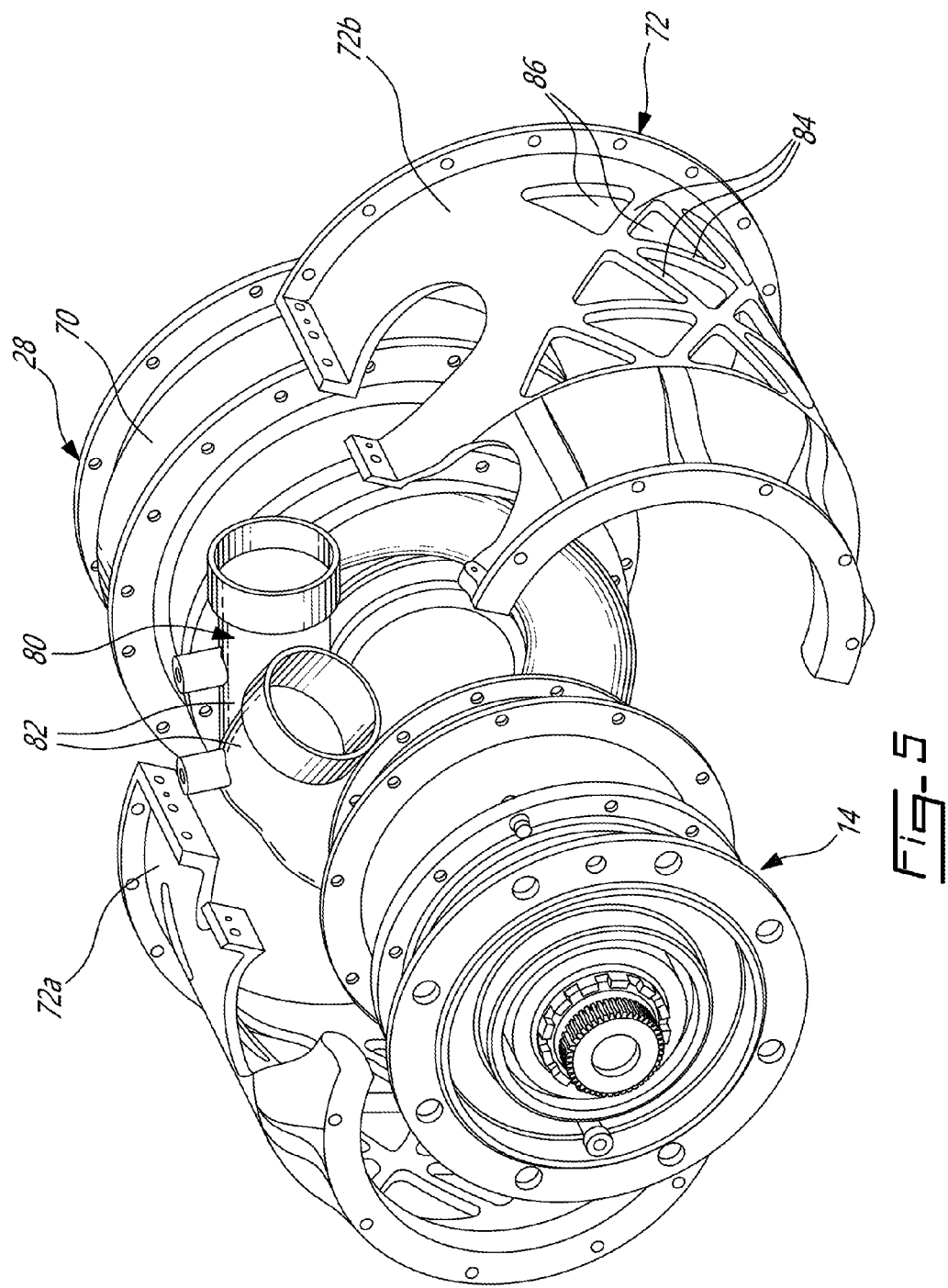
FIG. 5 is a schematic tridimensional view of the turbine module and part of the gearbox module of FIG. 3, with a support casing of the turbine module being shown in an exploded configuration.

Referring to FIG. 5, in a particular embodiment the support casing 72 is annular is configured as a split casing, with two interconnected sections 72a, 72b each extending approximately around half of the complete circumference of the support casing 72. Such a configuration may facilitate assembly of the support casing 72 and of the elements received therein. Alternate configurations are also possible, for example including more than two sections each extending around their respective portion of the circumference.

As can be seen in FIGS. 3 and 5, in the embodiment shown a significant portion of the support casing 72 is formed by a plurality of interconnecting ribs 84, with through openings 86 being defined between adjacent ones of the ribs 84 and between the ribs 84 and adjacent structure of the support casing 72. Although triangular openings 86 are shown, it is understood that any other appropriate shape can alternately be used. Part of the support casing 72 thus has a cage-like configuration, with the openings 86 enabling ventilation of the elements contained in the support casing 72. In the embodiment shown, the openings 86 allow ventilation of the bearing housings, seals, and/or any other element requiring ventilation and located in the portion of the gearbox module 14 received in the support casing 72. A smaller or greater portion (e.g. the entirety) of the support casing 72 may have the openings 86 defined therethrough, for example depending on the cooling requirements of the elements contained in the support casing 72.

Referring back to FIG. 3, the turbine module 28 further includes an inlet scroll 80 connected to the upstream end of the turbine casing 70 (e.g. rigidly connected thereto). The inlet scroll 80 is at least partially contained in the support casing 72, but does not have any direct rigid connection therewith, such as to be movable with respect thereto. In a particular embodiment, no direct connection is provided between the inlet scroll 80 and support casing 72; alternately, the two may be directly interconnected by a floating connection, i.e. a connection allowing relative movement therebetween. The openings 86 of the support casing 72 enable ventilation of the inlet scroll 80 received therein. The inlet scroll 80 includes an inlet pipe 82 for each exhaust port 50 of the engine core 12'. Each inlet pipe 82 is in fluid communication with an inlet of the first stage turbine 26, i.e. with the flow path 66 (see FIGS. 1 and 4) of the first stage turbine 26, upstream of its rotor blades 64. A respective exhaust pipe 68 provides a fluid connection between each exhaust port 50 of the engine core 12' and the respective inlet pipe 82.

Figure 6:
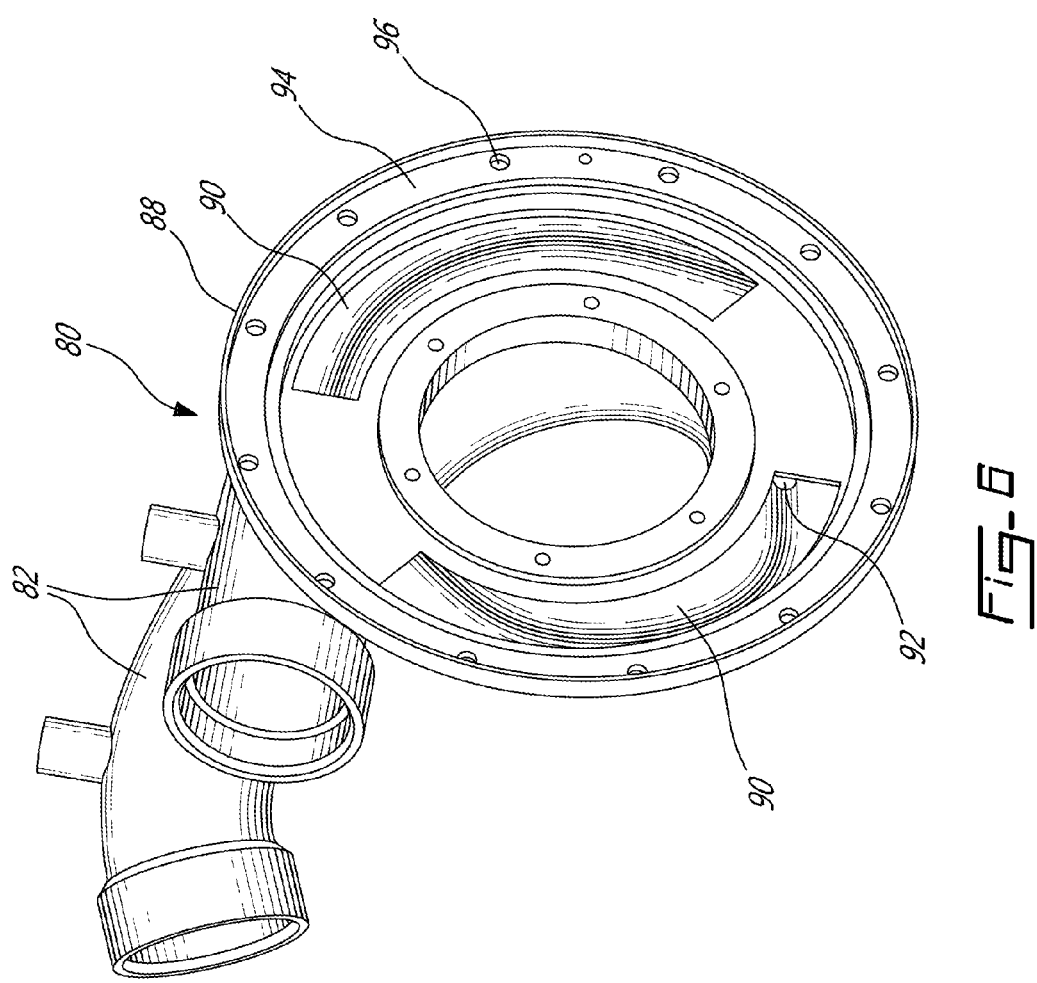
FIG. 6 is a schematic tridimensional view of an inlet scroll of the turbine module of FIG. 3.

Referring to FIG. 6, in a particular embodiment, the inlet scroll 80 includes an annular duct 88. Each inlet pipe 82 extends around part of a circumference of the duct 88, and communicates with a respective internal cavity 90 through a respective inlet port 92, with the inlet ports 92 and internal cavities 90 being circumferentially spaced apart. The inlet scroll 80 includes a flange 94 at its downstream end, for attachment to the turbine casing 70, for example through a circumferential array of fasteners received through corresponding holes 96 in the flange 94 and in a corresponding flange of the turbine casing 70. When attached to the turbine casing 70, the internal cavities 90 communicate with the flow path 66 of the first stage turbine 26. In a particular embodiment, the inlet scroll 80 is monolithic.

Figure 7:
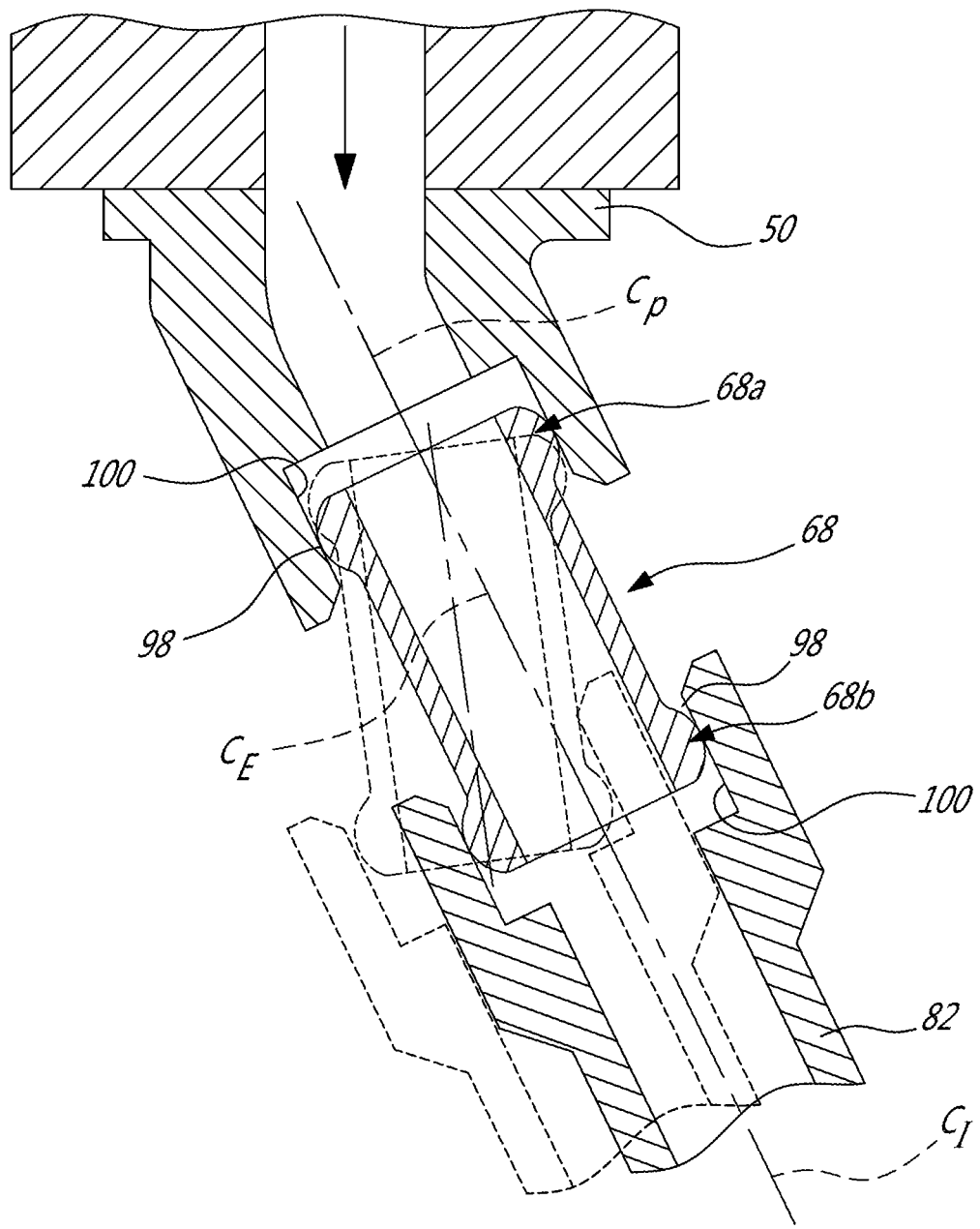
FIG. 7 is a schematic cross-sectional view of an exhaust pipe extending between an inlet pipe and an exhaust port of the engine assembly of FIG. 1, according to a particular embodiment.

Referring to FIG. 7, in a particular embodiment, the internal cross-sectional area of the conduit directing the exhaust flow in each exhaust pipe 68 and inlet pipe 82 is constant, and this constant internal cross-sectional area corresponds to that of the engine exhaust port 50 connected to the exhaust pipe 68. Alternately, the exhaust pipe 68 and/or inlet pipe 82 may have a non-constant internal cross-sectional area, and/or a different internal cross-sectional area than that of the exhaust port 50 (for example smaller than that of the corresponding exhaust port 50).

The exhaust pipe(s) 68, inlet pipe(s) 82 and remainder of the inlet scroll 80 (e.g. internal cavities 90) are shaped to direct the exhaust pulses onto the blades 64 of the first stage turbine 26 to allow the exhaust pulses to drive rotation of the rotor of the first stage turbine 26. The exhaust pipes 68 extend independently from one another, and have a relatively small length, which in a particular embodiment allows to minimize the distance between the exhaust port 50 and turbine 26 to minimize pressure losses of the exhaust pulses, and accordingly maximize the turbine's extraction of energy form the exhaust pulses.

Each exhaust pipe 68 has a first end sealingly engaged to the exhaust port 50 with a first connection 68a and a second end sealingly engaged to the inlet pipe 82 with a second connection 68b. The exhaust pipe 68 is movable about at least one of the connections 68a, 68b; in a particular embodiment, such movement prevent loads being transmitted between the engine core 12' and the inlet scroll 80 through the exhaust pipes 68, for example upon thermal expansion of the inlet scroll 80, exhaust pipes 68, engine core 12 and/or turbine module 28. One or both end(s) of the exhaust pipe 68 can thus move with respect to the exhaust port 50 or inlet pipe 82 it is connected thereto, while maintaining a seal at the connection against loss of exhaust flow therearound.

In the embodiment shown, the exhaust pipe 68 is movable about both connections 68a, 68b. Each end of the exhaust pipe 68 includes a spherical bearing surface 98, defined as an annular surface extending around the end and having a semi-circular cross-section. The spherical bearing surface 98 of each end is in sliding engagement with a cylindrical bearing surface 100 of the respective exhaust port 50 or inlet pipe 82 to form the connections 68a, 68b. Each connection 68a, 68b thus allows the exhaust pipe 68 to pivot around multiple axes extending transversely to the central axis $C_E$ of the exhaust pipe 68; the possible range of motion thus allows to change the angle between the central axis $C_E$ of the exhaust pipe 68 and the central axis $C_I$ of the inlet pipe 82 adjacent its connection 68b with the exhaust pipe 68, as well as the angle between the central axis $C_E$ of the exhaust pipe 68 and the central axis $C_P$ of the exhaust port 50 adjacent its connection 68a with the exhaust pipe 68. An example of possible relative movement is illustrated in a moved position shown in dotted lines in FIG. 7, where a shift in the position of the inlet pipe 82 with respect to that of the exhaust port 50 is compensated by a pivoting motion of the exhaust pipe 68.

Referring back to FIG. 3, one of the connected inlet and exhaust pipes 82, 68 extends through a respective opening 86' defined in the support casing 72. The inlet or exhaust pipe 82, 68 floatingly extends through the respective opening 86', i.e., is free to move within the opening. In the embodiment shown, the inlet and exhaust pipes 82, 68 are thus connected by extending through opening of the support casing 72, without contacting the support casing 72 and without any direct connection therewith. Alternately, a floating connection avoiding load transfer to the inlet and exhaust pipes 82, 68 may be provided. In the embodiment shown, the inlet pipes 82 extend through the opening 86' of the support casing 72, so that the connection 68b between each inlet pipe 82 and its respective exhaust pipe 68 is located outside of the support casing 72; the inlet pipes 82 extend through the openings 86' generally circumferentially, i.e. at a non-zero angle with respect to the rotational axis R of the turbine rotors, and spiral inward toward the turbine flow path. Other configurations are also possible.

Alternately, the exhaust pipes 68 may penetrate the support casing 72 through the corresponding openings 86' so that the connection 68b between each inlet pipe 82 and exhaust pipe 68 is located inside the support casing 72; the openings 86' of the support casing 72 and/or the connection 68b between the inlet and exhaust pipes 82, 68 are configured to prevent contact between the exhaust pipe 68 and support casing 72.

In a particular embodiment, the load path between the turbine casing 70 and the engine core 12' is thus defined by rigidly connecting the turbine casing 70 to the gearbox module with at least the support casing 72, and circulating the exhaust gas from each exhaust port 50 to the inlet scroll 80 through the pipes 68, 82 which extend through the support casing 72 without contacting it. The inlet scroll 80 is excluded from the load path by avoiding direct connection of the inlet scroll 80 to the support casing 72 and by allowing relative movement between each exhaust pipe 68 and one or both of the exhaust port 50 and the inlet scroll 80. The load path can thus be defined independently of the inlet scroll 80 and exhaust pipes 68 which undergo significant thermal expansion during use, which in a particular embodiment allows for reduction or minimization of the loads on the assembly 10 which could be induced by such thermal expansion.

The above description is meant to be exemplary only, and one skilled in the art will recognize that changes may be made to the embodiments described without departing from the scope of the invention disclosed. For example, the exhaust pipe(s) 68, inlet scroll 80 and support casing 72 may be used between an engine core and one or more turbine(s) not compounded with the engine core. The inlet scroll 80 may be configured to deliver exhaust gases to a radial turbine. Other modifications which fall within the scope of the present invention will be apparent to those skilled in the art, in light of a review of this disclosure, and such modifications are intended to fall within the appended claims.

The invention claimed is:

1. An engine assembly comprising:
   an engine core including an internal combustion engine having an exhaust port;
   a turbine module including a turbine casing containing a turbine, a support casing rigidly connecting the turbine casing to a remainder of the engine assembly, and an inlet scroll connected to the turbine casing without any direct rigid connection to the support casing, the inlet scroll including an inlet pipe in fluid communication with an inlet of the turbine; and
   an exhaust pipe connected to and providing fluid communication between the exhaust port and the inlet pipe, the exhaust pipe movable relative to at least one of the exhaust port and the inlet pipe at a corresponding connection therewith;
   wherein one of exhaust and inlet pipes floatingly extends through a corresponding opening defined in the support casing such that the one of exhaust and inlet pipes is free to move within said corresponding opening.

2. The engine assembly as defined in claim 1, wherein the one of the exhaust and inlet pipes extends through the corresponding opening at a non-zero angle with respect to a rotational axis of the turbine.

3. The engine assembly as defined in claim 1, wherein the inlet pipe extends through the corresponding opening, the inlet and exhaust pipes being connected exterior of the support casing.

4. The engine assembly as defined in claim 1, wherein the exhaust pipe is movable relative to each of the exhaust port and the inlet pipe about the corresponding connection.

5. The engine assembly as defined in claim 4, wherein first and second ends of the exhaust pipe include spherical bearing surfaces in sliding engagement with surfaces of the exhaust port and of the inlet pipe to form first and second connections, the exhaust pipe pivotable about each of the first and second connections to change an angle between a central axis of the exhaust pipe and central axes of the respective exhaust port and inlet pipe.

6. The engine assembly as defined in claim 1, wherein the support casing rigidly connects the turbine casing to a gearbox module rigidly connected to the engine core, the gearbox module drivingly engaging a rotatable shaft of the at least one internal combustion engine core a rotatable shaft of the turbine.

7. The engine assembly as defined in claim 1, wherein the inlet scroll includes an annular duct defining a respective internal cavity providing the fluid communication between each inlet pipe and the inlet of the turbine.

8. The engine assembly as defined in claim 1, wherein the support casing is annular and includes at least two interconnected sections, each section extending around only part of a complete circumference of the annular support casing.

9. The engine assembly as defined in claim 1, wherein at least a portion of the support casing is formed by a plurality of interconnecting ribs with through openings being defined between adjacent ones of the ribs.

10. The engine assembly as defined in claim 1, wherein the internal combustion engine includes a rotor sealingly and rotationally received within an internal cavity to provide rotating chambers of variable volume in the internal cavity, the rotor having three apex portions separating the rotating chambers and mounted for eccentric revolutions within the internal cavity, the internal cavity having an epitrochoid shape with two lobes.

11. A compound engine assembly comprising:
    an engine core including at least one internal combustion engine in driving engagement with an output shaft, each internal combustion engine including a rotor sealingly and rotationally received within an internal cavity to provide rotating chambers of variable volume in the internal cavity, each internal combustion engine including an exhaust port in fluid communication with the internal cavity thereof;
    a turbine module including a turbine casing containing a turbine having a turbine shaft in driving engagement with the output shaft through a gearbox module, a support casing rigidly connecting the turbine casing to the gearbox module, the turbine shaft extending inside the support casing, and an inlet scroll connected to the turbine casing without any direct rigid connection to the support casing, the inlet scroll including a respective inlet pipe for each exhaust port, each inlet pipe in fluid communication with an inlet of the turbine;
    an exhaust pipe for each exhaust port, each exhaust pipe connected to and providing fluid communication between the respective exhaust port and the respective inlet pipe, each exhaust pipe being movable relative to at least one of the respective exhaust port and the respective inlet pipe at a corresponding connection therewith;
    wherein one of each connected exhaust and inlet pipes extends through a corresponding opening defined through the support casing without any direct rigid connection to the support casing such that the one of each connected exhaust and inlet pipes is free to move within said corresponding opening.

12. The compound engine assembly as defined in claim 11 wherein the turbine has a pressure based reaction ratio of at most 0.25.

13. The compound engine assembly as defined in claim 11, wherein the turbine is a first turbine, the turbine casing also containing a second turbine having an inlet in fluid communication with an outlet of the first turbine, the second turbine having a reaction ratio greater than that of the first turbine.

14. The compound engine assembly as defined in claim 11, wherein the one of each connected exhaust and inlet pipes extends through the corresponding opening at a non-zero angle with respect to a rotational axis of the rotor of the turbine.

15. The compound engine assembly as defined in claim 11, wherein each inlet pipe extends through the corresponding opening, each exhaust pipe connected to the respective inlet pipe outside of the support casing.

16. The compound engine assembly as defined in claim 11, wherein each exhaust pipe is movable relative to each of the respective exhaust port and the respective inlet pipe at the corresponding connection.

17. The compound engine assembly as defined in claim 11, wherein the support casing is annular and includes at least two interconnected sections, each section extending around only part of a complete circumference of the annular support casing.

18. The compound engine assembly as defined in claim 11, wherein at least a portion of the support casing is formed by a plurality of interconnecting ribs with through openings being defined between adjacent ones of the ribs.

19. An engine assembly comprising: an internal combustion engine in fluid communication with a downstream turbine via an inlet scroll, the turbine drivingly connected to a gearbox, the turbine mounted to the gearbox via a support casing, the support casing having an opening through which the inlet scroll or an exhaust pipe providing fluid communication between the internal combustion engine and the inlet scroll passes from an exterior of the support casing to the interior of the support casing, the inlet scroll or exhaust pipe floatingly received through the opening such that the inlet scroll or exhaust pipe is free to move within the opening, the exhaust pipe having a movable connection with one or both of the inlet scroll and the internal combustion engine.

20. The engine assembly as defined in claim 19, wherein the exhaust pipe has a movable connection with both of the inlet scroll and the internal combustion engine.

* * * * *